US011225107B1

(12) United States Patent
Peck

(10) Patent No.: US 11,225,107 B1
(45) Date of Patent: Jan. 18, 2022

(54) AXLE CARRIER HOUSING WITH REINFORCEMENT STRUCTURE

(71) Applicant: Mahindra N.A. Tech Center, Auburn Hills, MI (US)

(72) Inventor: David E. Peck, Rochester Hills, MI (US)

(73) Assignee: Mahindra N.A. Tech Center, Auburn Hills, MI (US)

( * ) Notice: Subject to any disclaimer, the term of this patent is extended or adjusted under 35 U.S.C. 154(b) by 0 days.

(21) Appl. No.: 17/015,472

(22) Filed: Sep. 9, 2020

(51) Int. Cl.
| | |
|---|---|
| *F16H 48/08* | (2006.01) |
| *B60B 35/12* | (2006.01) |
| *B60B 35/16* | (2006.01) |
| *B60B 35/14* | (2006.01) |
| *F16H 57/037* | (2012.01) |
| *F16H 57/03* | (2012.01) |
| *F16C 19/36* | (2006.01) |
| *F16H 57/023* | (2012.01) |
| *F16H 57/02* | (2012.01) |

(52) U.S. Cl.
CPC ............ *B60B 35/125* (2013.01); *B60B 35/14* (2013.01); *B60B 35/16* (2013.01); *F16C 19/361* (2013.01); *F16H 48/08* (2013.01); *F16H 57/023* (2013.01); *F16H 57/03* (2013.01); *F16H 57/037* (2013.01); *F16C 2361/61* (2013.01); *F16H 2048/087* (2013.01); *F16H 2057/02052* (2013.01)

(58) Field of Classification Search
CPC .... F16H 48/08; F16H 2048/426; F16H 57/03; F16H 57/037; F16H 2057/02052; F16C 19/361; B60B 35/16
See application file for complete search history.

(56) References Cited

U.S. PATENT DOCUMENTS

| | | | |
|---|---|---|---|
| 2,204,287 | A | 6/1940 | Wilber |
| 2,478,180 | A | 8/1949 | Buckendale |
| 2,674,783 | A | 4/1954 | Schneider et al. |

(Continued)

FOREIGN PATENT DOCUMENTS

| | | |
|---|---|---|
| DE | 20221813 U1 | 2/2008 |
| JP | 10009258 A | 1/1998 |

(Continued)

OTHER PUBLICATIONS

U.S. Appl. No. 17/015,272, filed Sep. 9, 2020, David Peck.

(Continued)

*Primary Examiner* — Huan Le
(74) *Attorney, Agent, or Firm* — Harness, Dickey & Pierce, P.L.C.

(57) ABSTRACT

A vehicle axle assembly includes an axle housing and a carrier assembly. The carrier assembly includes a carrier housing and a differential assembly that includes a ring gear arranged in meshing engagement with a pinion gear. The gears are urged away from one another by separation forces during torque transfer. The carrier housing includes a curved wall circumscribed by a mounting flange as well as a plurality of integrally formed and parallel spaced apart gussets interconnecting the curved wall and the mounting flange. The gussets extend in a direction parallel to the gear separation forces to resist bending of the carrier housing. Other features increasing the structural rigidity of the one-piece carrier housing are discussed.

21 Claims, 14 Drawing Sheets

(56) References Cited

U.S. PATENT DOCUMENTS

| | | | |
|---|---|---|---|
| 2,961,888 A | 11/1960 | Wildhaber | |
| 3,706,350 A | 12/1972 | Bokovoy | |
| 3,838,751 A * | 10/1974 | Brown | F16H 57/0421 |
| | | | 184/6.12 |
| 4,921,036 A | 5/1990 | Kuwahara | |
| 5,267,489 A | 12/1993 | Ziech | |
| 5,271,294 A | 12/1993 | Osenbaugh | |
| 5,411,699 A | 5/1995 | Collette et al. | |
| 5,492,419 A | 2/1996 | Miller et al. | |
| 5,634,374 A | 6/1997 | Depietri | |
| 5,775,975 A | 7/1998 | Mizuno et al. | |
| 5,840,350 A | 11/1998 | Salemi | |
| 6,093,127 A | 7/2000 | DiDomenico et al. | |
| 6,349,781 B1 | 2/2002 | Kruse | |
| 6,364,803 B1 | 4/2002 | Barnholt et al. | |
| 6,514,169 B2 | 2/2003 | Turner et al. | |
| 6,561,788 B1 | 5/2003 | Gaudoin | |
| 6,623,867 B2 | 9/2003 | Crocco et al. | |
| 6,729,206 B2 | 5/2004 | Hayabuchi et al. | |
| 6,863,634 B2 | 3/2005 | Holman et al. | |
| 6,896,270 B1 | 5/2005 | Sturman et al. | |
| 6,948,924 B2 | 9/2005 | Tsau et al. | |
| 6,979,131 B1 | 12/2005 | Lippert et al. | |
| 7,004,277 B2 * | 2/2006 | Pollock | F16H 57/037 |
| | | | 180/346 |
| 7,137,183 B2 | 11/2006 | Stuart et al. | |
| 7,210,374 B2 | 5/2007 | Leimann | |
| 7,231,847 B2 | 6/2007 | Hibbler et al. | |
| 7,258,644 B2 | 8/2007 | Ziech et al. | |
| 7,287,911 B2 | 10/2007 | Dodoro et al. | |
| 7,306,536 B2 | 12/2007 | Ziech | |
| 7,377,598 B2 | 5/2008 | Doud et al. | |
| 7,503,240 B2 | 3/2009 | Hibbler et al. | |
| 7,537,390 B2 | 5/2009 | De Boer et al. | |
| 7,585,032 B2 | 9/2009 | Seeds et al. | |
| 7,658,128 B2 | 2/2010 | Sugano | |
| 7,984,552 B2 | 7/2011 | Doud et al. | |
| 8,166,848 B2 | 5/2012 | Uozumi et al. | |
| 8,176,811 B2 | 5/2012 | Peterson et al. | |
| 8,186,884 B2 | 5/2012 | Henneberger | |
| 8,464,611 B1 | 6/2013 | Chandler | |
| 8,469,462 B2 | 6/2013 | Doud et al. | |
| 8,573,087 B2 | 11/2013 | Stadtfeld | |
| 8,591,116 B2 | 11/2013 | Fedorovich | |
| 8,776,374 B2 | 7/2014 | Johnston et al. | |
| 8,881,401 B2 | 11/2014 | Aoyama et al. | |
| 8,911,312 B2 | 12/2014 | Itoo et al. | |
| 8,951,034 B2 | 2/2015 | Christiansen et al. | |
| 9,022,893 B2 | 5/2015 | Hirao et al. | |
| 9,151,329 B2 | 10/2015 | Katsaros | |
| 9,221,219 B2 | 12/2015 | Frederiksen | |
| 9,517,658 B2 * | 12/2016 | Chung | F16H 48/08 |
| 9,669,710 B2 | 6/2017 | Meixner | |
| 9,746,069 B2 | 8/2017 | Gerstenberger et al. | |
| 9,810,309 B2 | 11/2017 | Chen et al. | |
| 9,884,359 B2 | 2/2018 | Peters et al. | |
| 10,179,478 B2 | 1/2019 | Bauer et al. | |
| 10,352,431 B2 | 7/2019 | Nakagawa et al. | |
| 2003/0070501 A1 | 4/2003 | Sell | |
| 2005/0238273 A1 | 10/2005 | Kawamura et al. | |
| 2012/0021863 A1 | 1/2012 | Hirao et al. | |
| 2015/0020626 A1 | 1/2015 | Aoyama et al. | |
| 2015/0087461 A1 * | 3/2015 | Jackson | F16H 48/08 |
| | | | 475/160 |
| 2015/0211604 A1 | 7/2015 | Hirao et al. | |
| 2018/0259038 A1 | 9/2018 | Aoyama et al. | |
| 2019/0024772 A1 | 1/2019 | Ketchel et al. | |
| 2019/0293168 A1 | 9/2019 | Abe et al. | |

FOREIGN PATENT DOCUMENTS

| | | |
|---|---|---|
| JP | H 109259 A | 1/1998 |
| KR | 20140069451 A | 6/2014 |
| KR | 10-1982224 B1 | 5/2019 |
| WO | WO-2017/216404 A1 | 12/2017 |

OTHER PUBLICATIONS

U.S. Appl. No. 17/015,294, filed Sep. 9, 2020, David Peck.
U.S. Appl. No. 17/015,430, filed Sep. 9, 2020, David Peck.
U.S. Appl. No. 17/015,543, filed Sep. 9, 2020, David Peck.

* cited by examiner

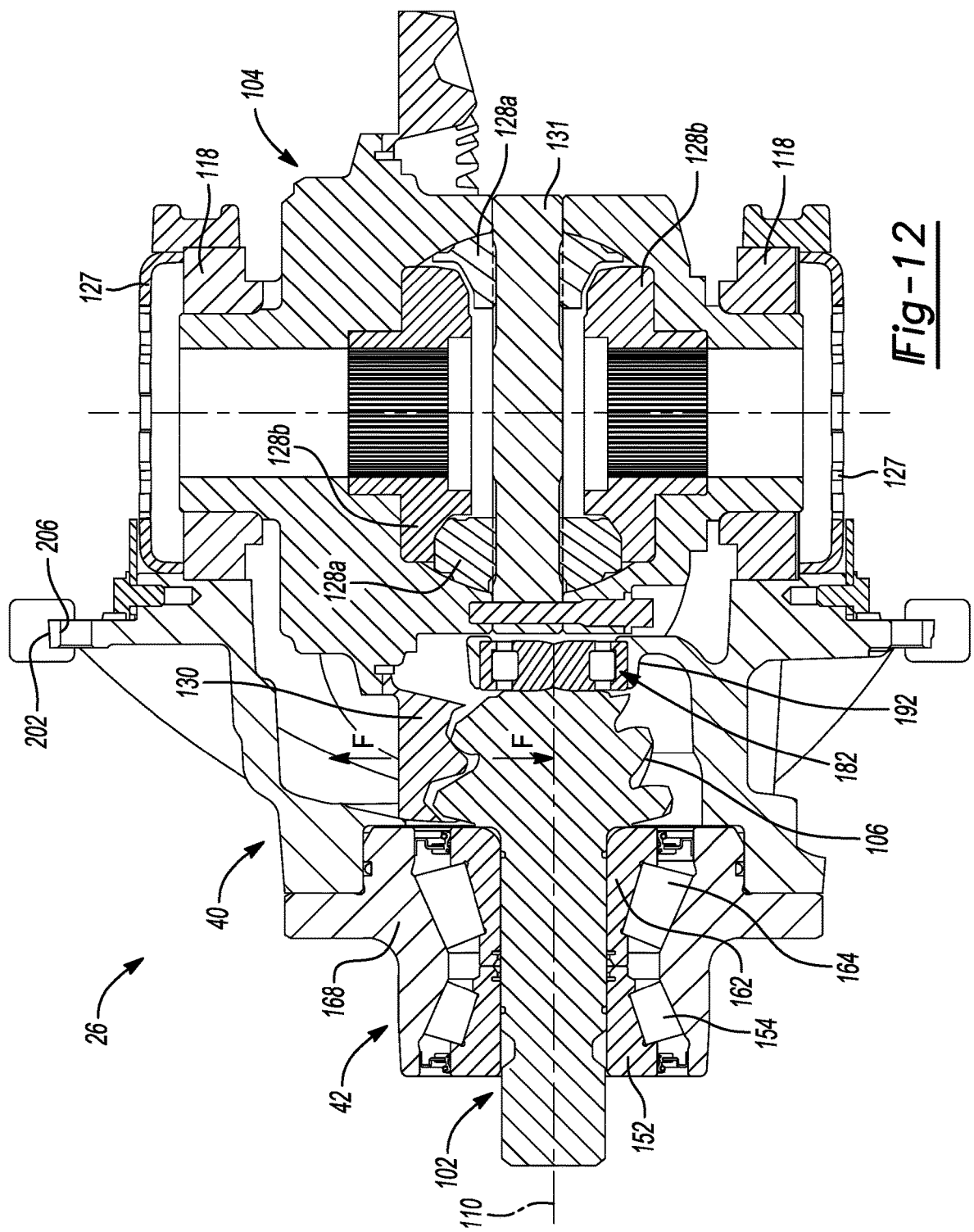

AXLE CARRIER HOUSING WITH REINFORCEMENT STRUCTURE

FIELD

The disclosure relates to axle assemblies for vehicles, such as front or rear drive axle assemblies used in automobiles and trucks.

BACKGROUND

This section provides background information related to the present disclosure which is not necessarily prior art.

Axle assemblies are commonly used to support and/or rotationally drive the wheels of a vehicle. For example, a vehicle may include a front axle assembly to which front wheels of the vehicle are mounted and a rear axle assembly to which rear wheels of the vehicle are mounted. Typically, the front and rear axle assemblies extend across the vehicle in a transverse direction that is perpendicular to the direction of vehicle travel. The front and rear axle assemblies support the front and rear wheels and are connected to a body and/or frame of the vehicle by front and rear suspension systems that articulate to allow the front and rear axle assemblies to move up and down relative to the body and/or frame of the vehicle.

One or more axle assemblies of the vehicle may also transfer rotational power and torque provided by an engine of the vehicle to the wheels. For example, the engine may rotationally drive a drive shaft through a transmission assembly. The axle assembly may include a carrier assembly having a pinion gear that is rotationally driven by the drive shaft in meshed engagement with a ring gear. The ring gear is fixed for rotation with a differential that transfers rotational power and torque from the pinion gear to a pair of axle shafts that extend out from the differential in opposite transverse directions. The carrier assembly includes a pinion input bearing used to support the pinion gear. The pinion gear is typically cantilever mounted and may deflect from its axis of rotation more than a desired amount based on gear separation forces generated during torque transfer thereby causing an undesirable misalignment between gear teeth.

Axle assemblies are part of the unsprung mass/weight of the vehicle because they move with the wheels instead of with the vehicle body. In many applications, a reduction in the unsprung mass of the vehicle affords improved handling, performance, and ride control because there is less unsprung inertia to control during cornering, braking, acceleration, and impacts caused when the vehicle travels over an uneven surface (i.e., bumps). As a result of the above concerns, there is a need for an axle assembly that exhibits excellent structural rigidity to counteract the gear separation forces while minimizing axle weight.

SUMMARY

This section provides a general summary of the disclosure, and is not a comprehensive disclosure of its full scope or all of its features.

In accordance with one aspect of the present disclosure, an improved axle assembly for a vehicle is provided. The axle assembly includes an axle housing and a carrier assembly. The carrier assembly includes a carrier housing and a differential assembly that includes a ring gear arranged in meshing engagement with a pinion gear. Gear separation forces urge the gears away from one another during torque transfer. The carrier housing includes a curved wall circumscribed by a mounting flange as well as a plurality of integrally formed and parallel spaced apart gussets interconnecting the curved wall and the mounting flange. The gussets extend in a direction parallel to the gear separation forces to resist bending of the carrier housing.

In at least one arrangement, the axle assembly of the present disclosure exhibits increased operational efficiency and reduced weight achieved by combining a dual bearing support on opposite sides of the pinion gear with a reinforced carrier housing including integrally formed gussets to assure that the pinion gear maintains its proper position during torque transfer through the ring and pinion gear set.

In accordance with another aspect of the present disclosure, the axle assembly includes an axle housing and a carrier assembly mounted to the axle housing. The carrier assembly includes a carrier housing that is fixedly mounted to the axle housing, a pinion that includes a pinion gear and a pinion shaft that extends through the carrier housing along a pinion shaft axis, and a differential assembly that is rotatably supported by the carrier housing. The differential assembly includes a differential housing and a ring gear fixed for rotation with the differential housing about a ring gear axis. The ring gear is arranged in meshing engagement with the pinion gear. The carrier housing is a one-piece member including a curved wall and an integral spigot support boss protruding from the curved wall. The support boss includes an uninterrupted ring in receipt of a spigot bearing. The pinion shaft is rotatably supported by the spigot bearing and the spigot support boss. The carrier housing further including a first strut interconnecting the curved wall and the spigot support boss. The first strut extends in a direction parallel to the pinion shaft axis.

DRAWINGS

Other advantages of the present invention will be readily appreciated, as the same becomes better understood by reference to the following detailed description when considered in connection with the accompanying drawings wherein:

FIG. 12 is a cross-sectional view through the carrier assembly along an axis of rotation of the pinion gear;

DETAILED DESCRIPTION

Figure 1:
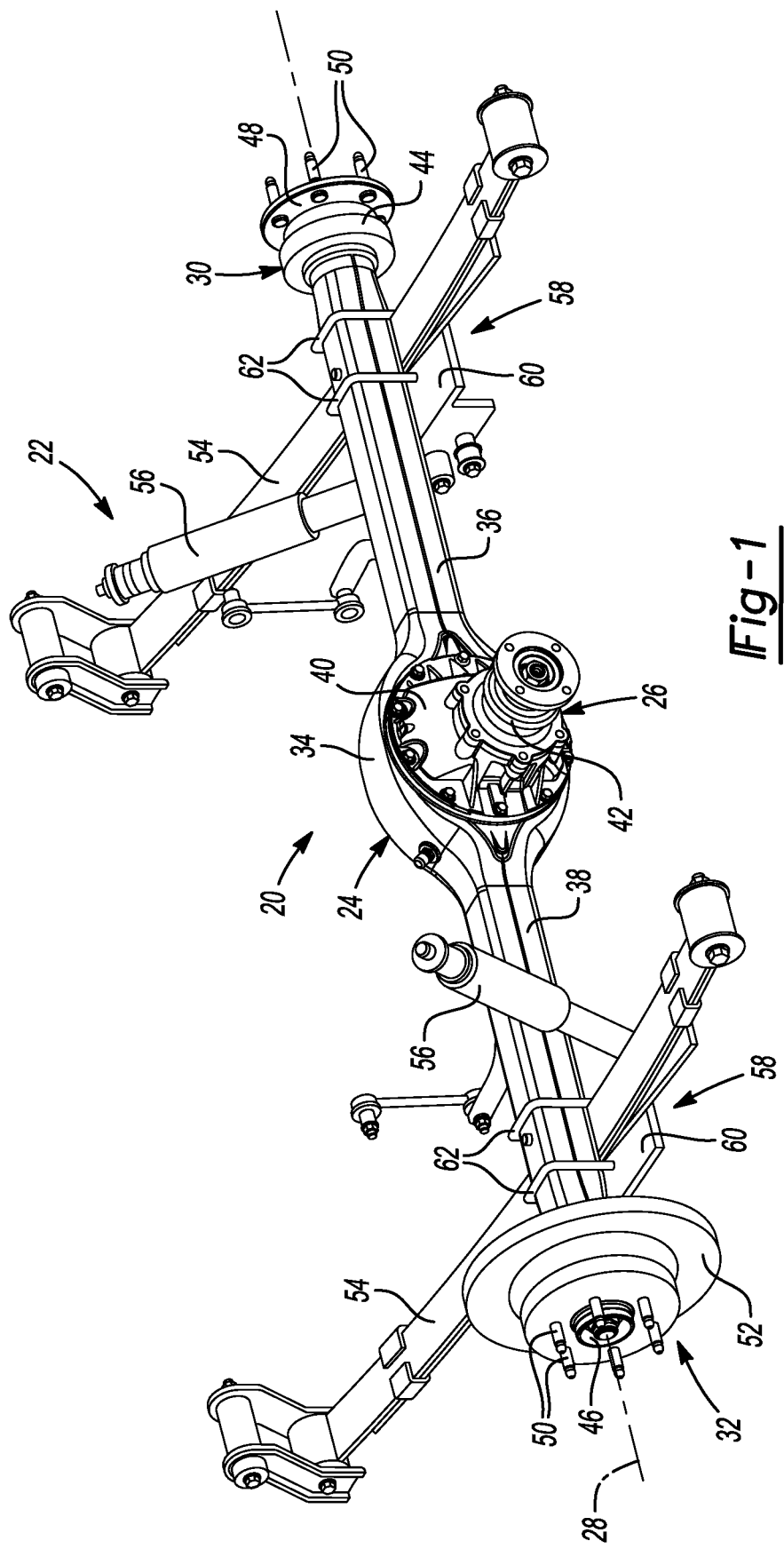
FIG. 1 is a front perspective view of an exemplary axle assembly that has been constructed in accordance with the present disclosure and that is shown in combination with an exemplary suspension system.
Figure 2:
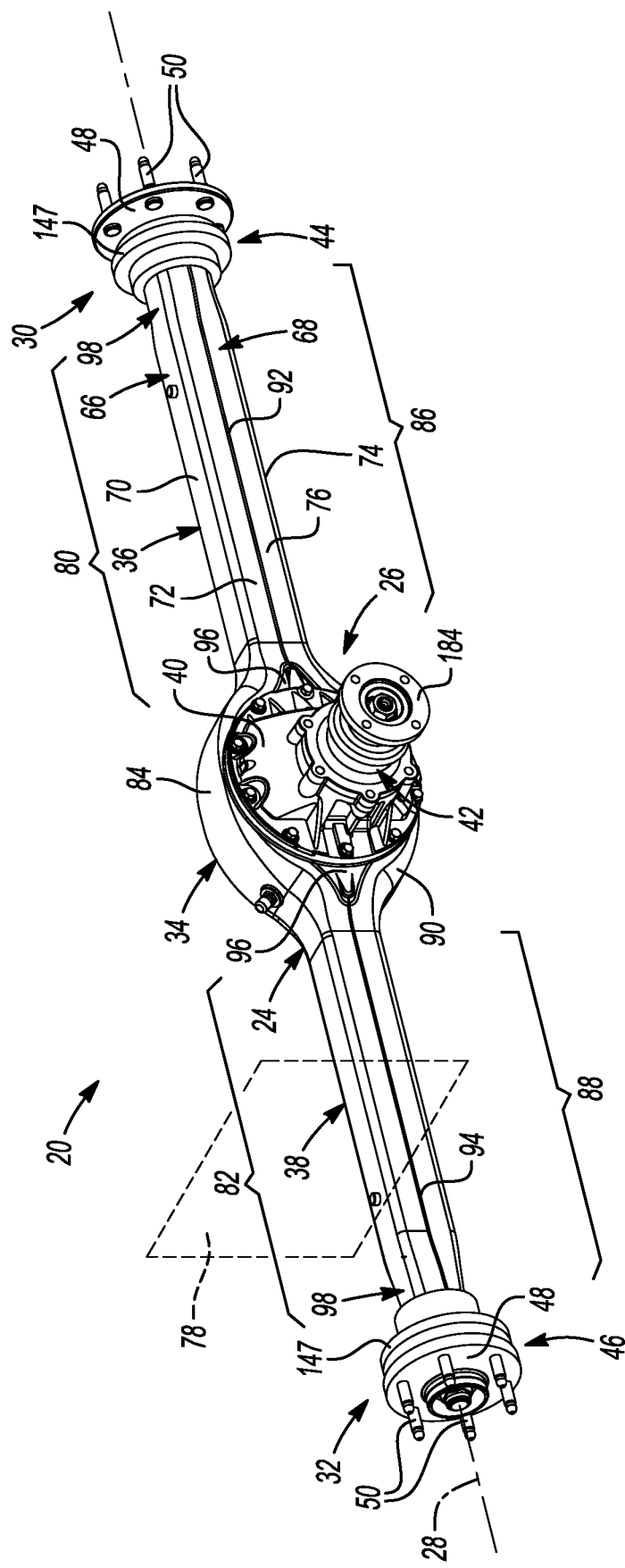
FIG. 2 is a front perspective view of the exemplary axle assembly shown in FIG. 1.
Figure 3:
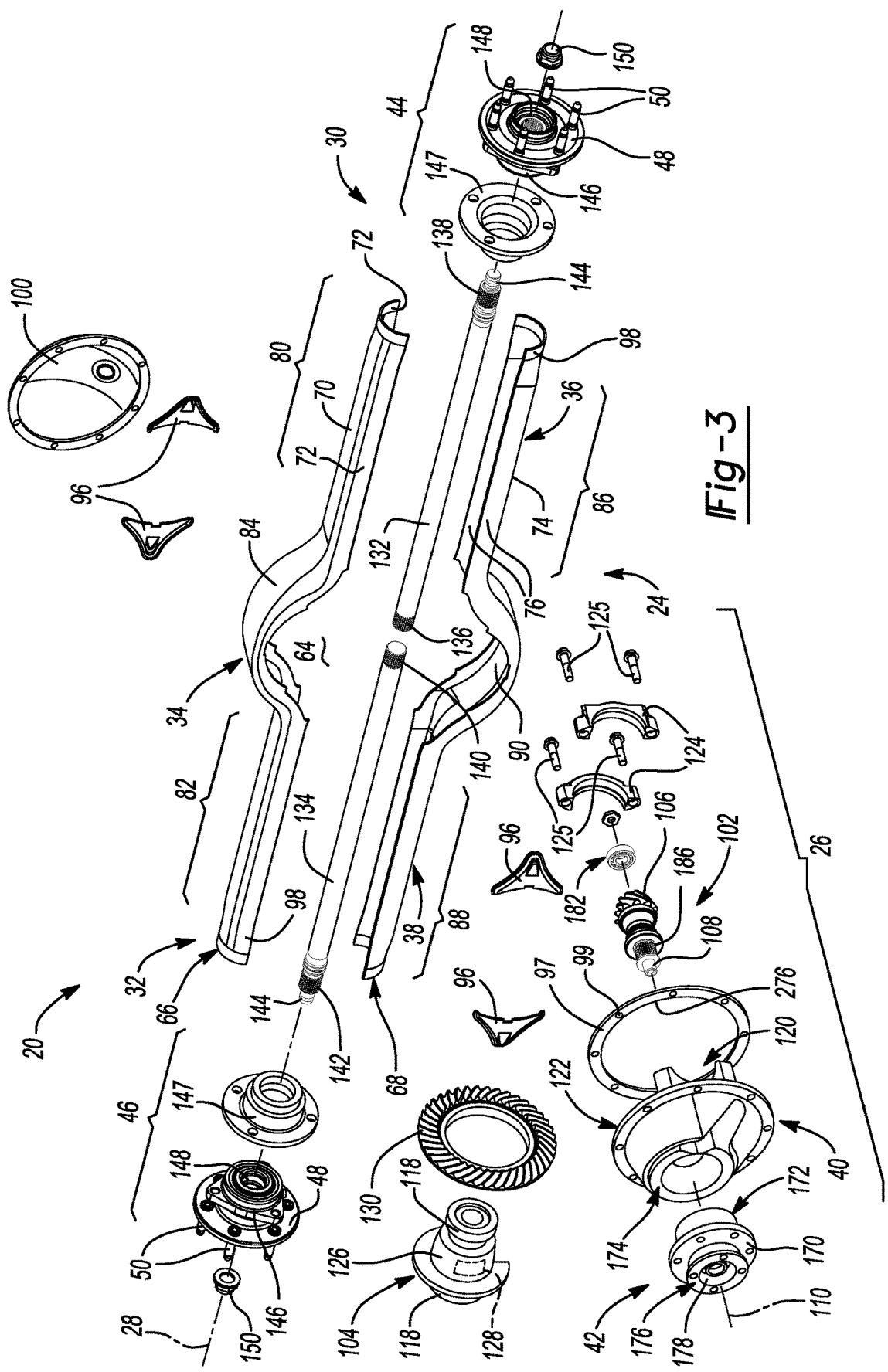
FIG. 3 is an exploded perspective view of the exemplary axle assembly shown in FIG. 1.

Referring to the Figures, wherein like numerals indicate corresponding parts throughout the several views, an axle assembly 20 for a vehicle is illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIGS. is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 illustrates the axle assembly 20 of the present disclosure connected to an exemplary suspension system 22. The axle assembly 20 includes an axle housing 24 and a carrier assembly 26. The axle housing 24 extends longitudinally along a longitudinal axis 28 between a first wheel end 30 and a second wheel end 32. The axle housing 24 includes a center section 34, a first tubular segment 36 that extends longitudinally between the first wheel end 30 and the center section 34, and a second tubular segment 38 that extends longitudinally between the second wheel end 32 and the center section 34. The carrier assembly 26 includes a carrier housing 40 and a self-lubricating cartridge pinion input bearing 42 that is mounted to the carrier housing 40. A first self-lubricating and unitized grease wheel end bearing 44 is mounted to the first wheel end 30 of the axle housing 24 and a second self-lubricating and unitized grease wheel end bearing 46 is mounted to the second wheel end 32 of the axle housing 24. Each of the first and second self-lubricating and unitized grease wheel end bearings 44, 46 include wheel flanges 48 that are provided with circumferentially spaced wheel studs 50. A brake rotor 52 may be mounted to the wheel flanges 48 with the wheel studs 50 extending through the brake rotor 52. It should therefore be appreciated that the wheels of a vehicle (not shown) may be secured to the wheel flanges 48 of the first and second self-lubricating and unitized grease wheel end bearings 44, 46 by the wheel studs 50.

The suspension system 22 supporting the axle assembly 20 includes a pair of leaf springs 54 and a pair of dampers 56. Both the leaf springs 54 and the dampers 56 are connected to the axle assembly 20 by a pair of shackles 58. The shackles 58 include shackle plates 60 that are clamped to the first and second tubular segments 36, 38 of the axle housing 24 by U-bolts 62. The free ends of the leaf springs 54 and dampers 56 shown in FIG. 1 are configured to bolt to a body or frame of the vehicle (not shown). It should be appreciated that the axle assembly 20 illustrated in FIG. 1 could serve as either a front axle or rear axle of the vehicle.

Referring now to FIGS. 2-5, the center section 34 of the axle housing 24 is hollow, as are the first and second tubular segments 36, 38. The center section 34 and the first and second tubular segments 36, 38 of the axle housing 24 therefore cooperate to define a combined inner volume 64 of the axle housing 24. The axle housing 24 includes an upper beam 66 and a lower beam 68 that are positioned in a clam-shell arrangement. As a result, the upper and lower beams 66, 68 cooperate to form the center section 34 and the first and second tubular segments 36, 38 of the axle housing 24. The upper beam 66 of the axle housing 24 includes an upper wall 70 and a pair of upper beam side walls 72 that extend down from the upper wall 70. The lower beam 68 of the axle housing 24 includes a lower wall 74 and a pair of lower beam side walls 76 that extend up from the lower wall 74. Consequently, the upper and lower beams 66, 68 having opposing U-shaped cross-sections when viewed from the side (i.e., the cross-sections of the upper and lower beams 66, 68 are U-shaped when the cross-sections are taken along a transverse plane 78 that is perpendicular to the longitudinal axis 28).

The upper beam 66 of the axle housing 24 includes a first longitudinal section 80, a second longitudinal section 82, and an upwardly curved section 84 positioned longitudinally between the first and second longitudinal sections 80, 82. The lower beam 68 of the axle housing 24 includes a third longitudinal section 86, a fourth longitudinal section 88, and a downwardly curved section 90 that is positioned longitudinally between the third and fourth longitudinal sections 86, 88. The first longitudinal section 80 of the upper beam 66 cooperates with the third longitudinal section 86 of the lower beam 68 to form the first tubular segment 36 of the axle housing 24. The second longitudinal section 82 of the upper beam 66 cooperates with the fourth longitudinal section 88 of the lower beam 68 to form the second tubular segment 38 of the axle housing 24. The upwardly curved section 84 of the upper beam 66 and the downwardly curved section 90 of the lower beam 68 thus form the center section 34 of the axle housing 24. Although other configurations are possible, the upper and lower beams 66, 68 may be made of metal, such as iron, steel, or aluminum, and the upper beam side walls 72 may be welded to the lower beam side walls 76 at first and second seams 92, 94, which are disposed on opposing sides of the center section 34. Truss plates 96 may also be welded to the upper and lower beam side walls 70, 76 near the center section 34 for added strength and/or ease of manufacturing. A mounting ring 97 is fixed to axle housing 24 by a continuous weld. Threaded mounting holes 99 are circumferentially spaced apart to facilitate coupling carrier assembly 26 to axle housing 24. Optionally, the first and second tubular segments 36, 38 of the axle housing 24 have an inward taper 98 at the first and second wheel ends 30, 32 to accommodate the first and second self-lubricating and unitized grease wheel end bearings 44, 46.

The carrier assembly 26 is housed in the center section 34 of the axle housing 24 and the carrier housing 40 is fixedly mounted to the center section 34 of the axle housing 24. A differential cover plate 100 is also fixedly mounted to the center section 34 of the axle housing 24, opposite the carrier housing 40. Although other configurations are possible, both the carrier housing 40 and the differential cover plate 100 may be made of metal, such as iron, steel, or aluminum, and may be bolted or welded to the axle housing 24. The carrier assembly 26 also includes a pinion 102 and a differential assembly 104.

The pinion 102 includes a pinion gear 106 and a pinion shaft 108 that extends through the carrier housing 40 along a pinion shaft axis 110. The pinion shaft axis 110 extends perpendicularly relative to the longitudinal axis 28 of the axle housing 24 and is spaced from the longitudinal axis 28 by a hypoid offset distance 112 (see FIG. 5). By way of example only and without limitation, the hypoid offset distance 112 may be small, such as 1 to 20 millimeters (mm) and preferably 10 millimeters (mm). This small hypoid offset reduces friction (e.g., scuffing losses) in the pinion gear mesh by approximately 3 percent compared to larger hypoid offset distances in the 35-45 millimeter (mm) range.

If the hypoid offset is reduced to zero, the axes would intersect and the gear arrangement would no longer be considered a hypoid gearset but be labeled as a spiral bevel gearset. For many applications, it is important that at least some hypoid offset is provided to allow the gearset to transmit a higher torque than a similarly sized spiral bevel gearset. The hypoid arrangement also introduces some relative sliding motion across the contact pattern between the pinion gear and the ring gear which produces a quiet gearset during operation. The embodiment of the present disclosure provides an optimized final drive gearset by simultaneously minimizing the hypoid offset to increase mechanical efficiency of the gearset while maintaining a desired amount of hypoid offset to increase torque transfer capacity and reduce noise.

It should be appreciated that the hypoid offset reduction is made possible by implementing a combination of features. The carrier housing 40 is stiffened by integrally forming the carrier housing with a number of particularly sized and positioned ribs to maintain proper position of pinion gear 106. In addition, the loading configuration of the pinion shaft is changed from the typical cantilevered arrangement where both pinion shaft bearings are on one side of the pinion gear to a straddled design where the cartridge bearing is on one side of the pinion gear and a spigot bearing is on the opposite side of the pinion gear. The straddled bearing design in combination with the reinforced carrier housing substantially minimizes the angular deflection imparted on the pinion shaft during torque transmission. The straddled design is described in greater detail below in relation to a spigot bearing and the improved carrier housing is described and depicted at FIGS. 6-10.

Pinion shaft 108 may be configured to include an inboard, or first pinion shaft segment 114 and an outboard, or second pinion shaft segment 116. The pinion gear 106 is positioned axially between the inboard pinion shaft segment 114 and the outboard pinion shaft segment 116 such that the inboard pinion shaft segment 114 protrudes inwardly from the pinion gear 106 and the outboard pinion shaft segment 116 protrudes outwardly from the pinion gear 106 along the pinion shaft axis 110. Pinion shaft 108 includes an eternally splined portion 117.

Figure 4:
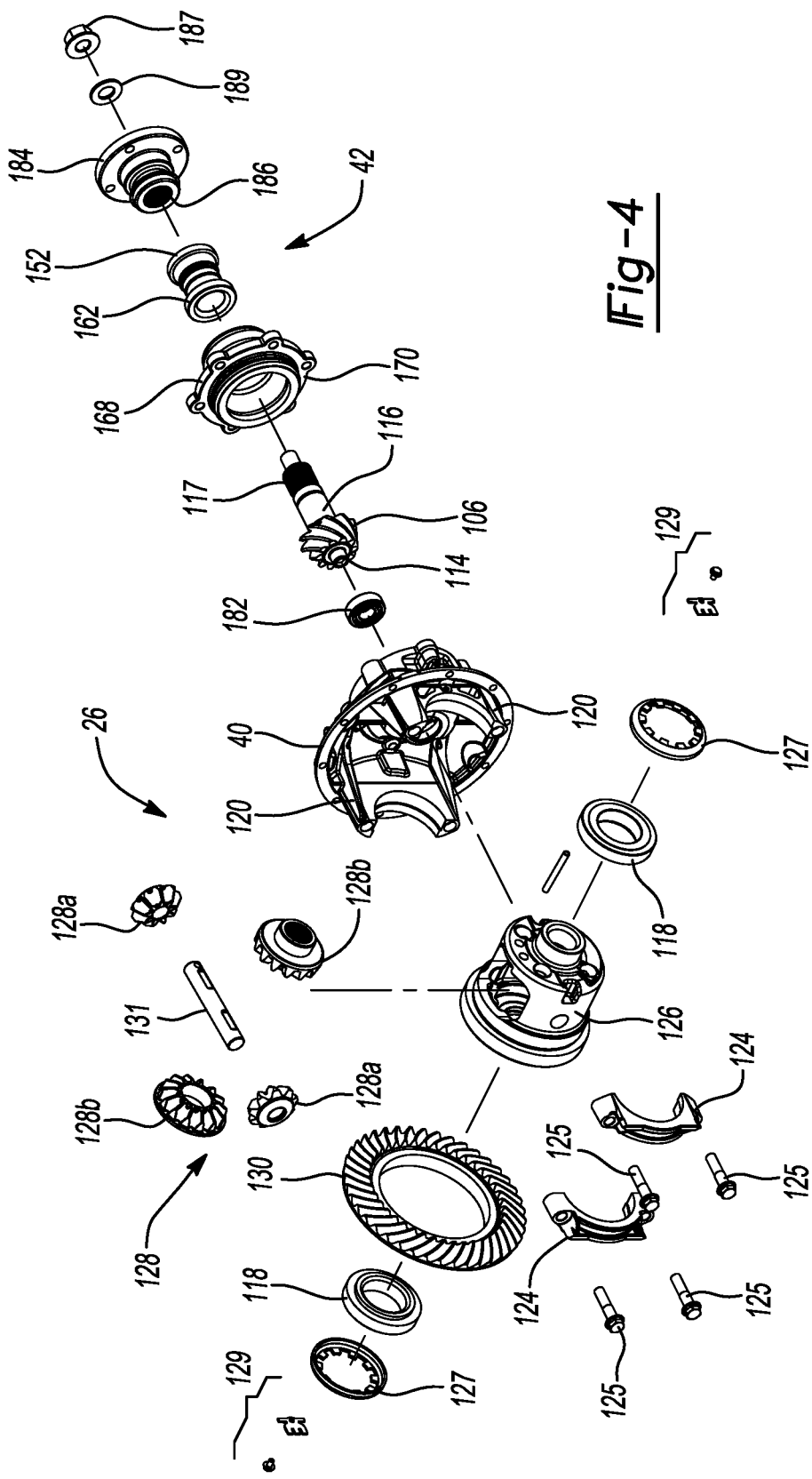
FIG. 4 is an exploded perspective view of a carrier assembly of the exemplary axle assembly shown in FIG. 1.

As shown in FIG. 4, differential assembly 104 is rotatably supported on the carrier housing 40 by a pair of differential bearings 118. As a result, the differential assembly 104 is rotatable relative to the carrier housing 40 about the longitudinal axis 28. The differential bearings 118 are held between a pair of mounting bosses 120a, 120b that extend from an inboard side 122 of the carrier housing 40 and a pair of caps 124 that extend partially about the differential bearings 118. Although other configurations are possible, the caps 124 may be bolted to the mounting bosses 120a, 120b of the carrier housing 40 via threaded fasteners 125. Bearing adjustment nuts 127 are rotatable to vary the preload on differential bearings 118. Retainers 129 restrict the adjustment nuts 127 from rotation after the differential bearing preload has been set.

Differential assembly 104 includes a differential body or differential housing 126 and a planetary gearset 128. Planetary gear set 128 includes pinion gears 128a drivingly engaged with side gears 128b. Pinions gears 128a are supported for rotation on a cross-shaft 131. Alternate arrangement differential gearsets, such as parallel axis gears, are contemplated as the gearset shown is merely exemplary.

A ring gear 130 is fixed to the differential housing 126 and arranged in meshing engagement with the pinion gear 106. The ring gear 130 rotates co-axially about the longitudinal axis 28 of the axle housing 24. By way of example and without limitation, the ring gear 130 may be fixed to the differential housing 126 by laser welding instead of by a flanged and bolted connection, which can help reduce weight, eliminate fastener costs, eliminate bolts as a potential failure mode, and reduce churning losses. It should be appreciated that the differential assembly 104 may be any one of the various types of differentials known in the industry, including without limitation, open differentials, limited slip differentials, electronic differentials, and locking differentials.

The axle assembly 20 also includes first and second axle shafts 132, 134 that extend out along the longitudinal axis 28 from opposing sides of the differential assembly 104. The first axle shaft 132 extends longitudinally through the first tubular segment 36 of the axle housing 24 between a first axle shaft inboard end 136 and a first axle shaft outboard end 138. The second axle shaft 134 extends longitudinally through the second tubular segment 38 of the axle housing 24 between a second axle shaft inboard end 140 and a second axle shaft outboard end 142. The first and second axle shaft inboard ends 136, 140 and the first and second axle shaft outboard ends 138, 142 are splined. The first and second axle shaft outboard ends 138, 142 may also include threaded portions 144. The first and second axle inboard ends 136, 140 are received in the differential assembly 104 and are rotationally coupled to the pinion gear 106 through the planetary gearset 128.

The axle assembly 20 of the present disclosure uniquely includes a self-lubricating bearing arrangement that includes the combination of a self-lubricating cartridge pinion input bearing 42 with first and second self-lubricating and unitized grease wheel end bearings 44, 46. In accordance with this arrangement, the outboard pinion shaft segment 116 is rotatably supported by the self-lubricating cartridge pinion input bearing 42, which is mounted to the carrier housing 40 and allows the pinion 102 to rotate relative to the carrier housing 40 about the pinion shaft axis 110. The first axle shaft outboard end 138 is rotatably supported by the first self-lubricating and unitized grease wheel end bearing 44, which is mounted to the first wheel end 30 of the axle housing 24. The second axle shaft outboard end 142 is rotatably supported by a second self-lubricating and unitized grease wheel end bearing 46, which is mounted to the second wheel end 32 of the axle housing 24. As a result, the first and second axle shafts 132, 134 can rotate within the axle housing 24 about the longitudinal axis 28.

As explained above, wheel flanges 48 of the first and second self-lubricating and unitized grease wheel end bearings 44, 46 have circumferentially spaced wheel studs 50. Wheel flanges 48 are connected to and rotate with an inner race 146 of the first and second self-lubricating and unitized grease wheel end bearings 44, 46. The inner races 146 include splined bores 148 that receive the first and second axle shaft outboard ends 138, 142 such that the splines on these respective components rotatably couple the inner races 146 and thus the wheel flanges 48 to the first and second axle shafts 132, 134. Because the splines on the first and second axle shaft inboard ends 136, 140 mate with the differential assembly 104, which is rotatably driven by the ring gear/pinion gear mesh, the rotational power and torque of the engine can be transmitted to the wheels of the vehicle. The first and second self-lubricating and unitized grease wheel end bearings 44, 46, also include outer races 147 that extend annularly about the inner races 146. The outer races 147 are fixedly mounted to the first and second wheel ends 30, 32 of the axle housing 24, such as by welding or a bolted connection. Greased bearings (not shown) may be provided between the inner and outer races 146, 147 to reduce friction. These greased bearings could be tapered roller bearings, high contact ball bearings, or a combination of tapered roller bearings and high contact ball bearings depending on the desired load rating. Wheel end nuts 150 thread onto the threaded portions 144 of the first and second axle shaft outboard ends 138, 142 to prevent free play along the longitudinal axis 28 between the wheel flanges 48 and the first and second axle shafts 132, 134.

In accordance with this design, the first and second axle shafts 132, 134 are provided in a full floating arrangement, where both the first and second axle shaft inboard ends 136, 140 and both the first and second axle shaft outboard ends 138, 142 have splined connections and are supported by bearings 44, 46, 118. This full floating arrangement provides better support for the first and second axle shafts 132, 134, which reduces binding and distributes loading between multiple bearings 44, 46, 118 for improvements in mechanical efficiency and durability.

Figure 5:
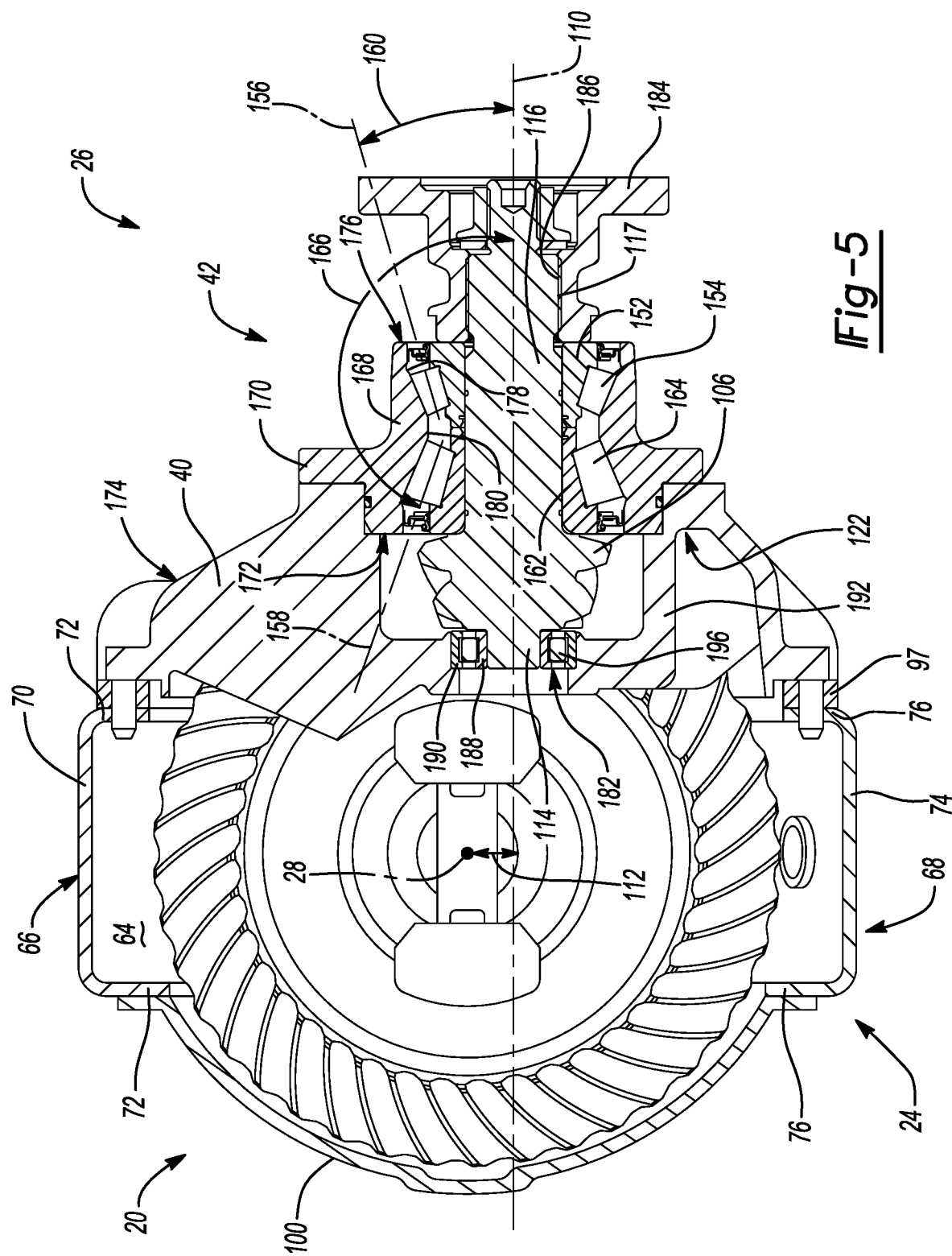
FIG. 5 is a side section view of the exemplary axle assembly.
Figure 7:
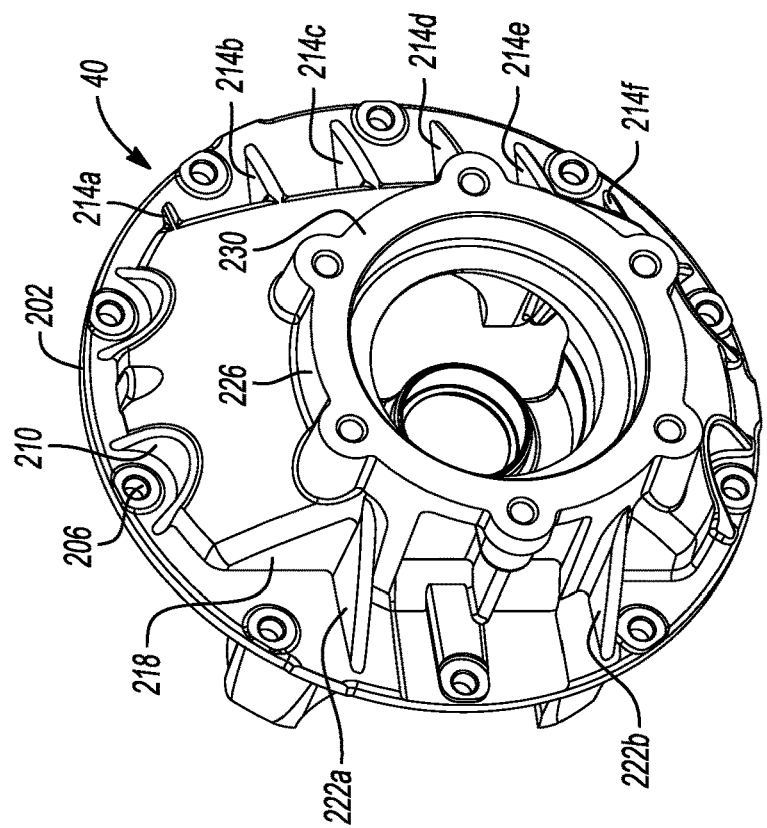
FIGS. 6-9 are perspective views of the carrier housing from different angles.
Figure 6:
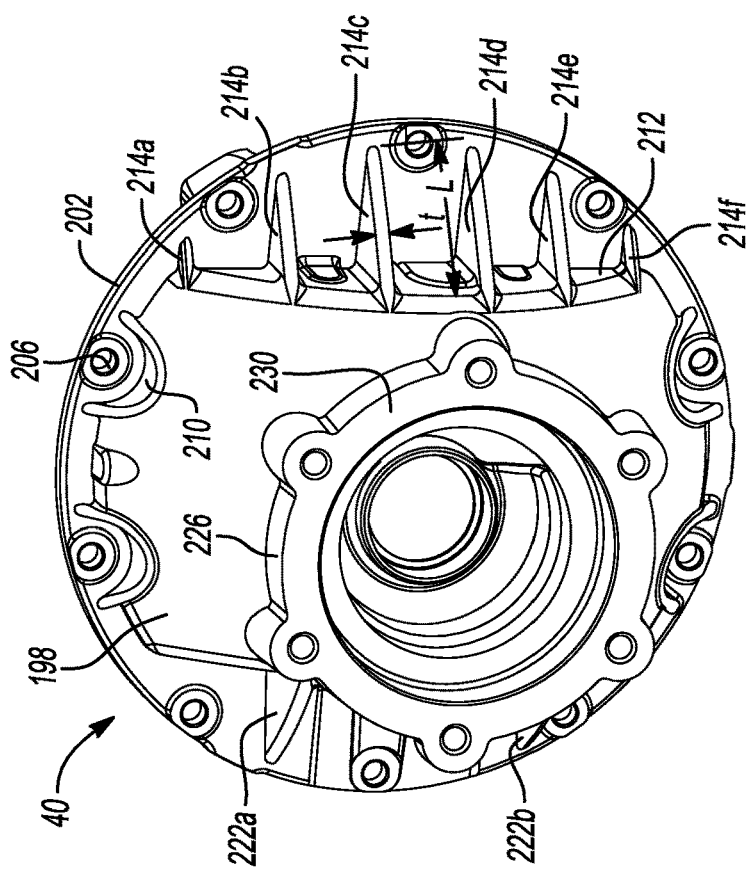

As best seen in FIGS. 4 and 5, the self-lubricating cartridge pinion input bearing 42 includes a first cone 152 that extends annularly about the outboard pinion shaft segment 116. The first cone 152 supports a first set of cylindrical roller bearings 154 at a number of circumferentially spaced positions. Each cylindrical roller bearing 154 in the first set of cylindrical roller bearings 154 rotates about its own roller bearing axis 156 that is arranged at a first angle 160 relative to the pinion shaft axis 110 and can rotate relative to the first cone 152 and the pinion shaft 108. The first angle 160 is an acute angle (i.e., greater than zero degrees, but less than 90 degrees relative to the pinion shaft axis 110) with an arc that opens away from the pinion gear 106. The self-lubricating cartridge pinion input bearing 42 also includes a second cone 162 that extends annularly about the outboard pinion shaft segment 116 at a location that is positioned axially between the first cone 152 and the pinion gear 106. The second cone 162 supports a second set of cylindrical roller bearings 164 at a number of circumferentially spaced positions. Each cylindrical roller bearing 164 in the second set of cylindrical roller bearings 164 rotates about its own roller bearing axis 158 that is arranged at a second angle 166 relative to the pinion shaft axis 110 and can rotate relative to the second cone 162 and the pinion shaft 108. The second angle 166 is an obtuse angle (i.e., greater than 90 degrees, but less than 180 degrees relative to the pinion shaft axis 110) with an arc that opens away from the pinion gear 106. In the illustrated embodiment, the first and second angles 160, 166 are supplementary angles, meaning that the sum of the first and second angles 160, 166 equals 180 degrees.

The self-lubricating cartridge pinion input bearing 42 includes a one-piece cup 168 that extends annularly about the cylindrical roller bearings 154, 164. The one-piece cup 168 includes a cup flange 170 that is fixedly coupled to the carrier housing 40, such as through a bolted connection. The one-piece cup 168 extends axially between an inboard edge 172 that abuts an outside face 174 of the carrier housing 40 and an outboard edge 176 opposite the inboard edge 172 that faces away from the carrier housing 40. The one-piece cup 168 also includes a tapered bore 178 that increases in diameter moving in opposing directions from an intermediate portion 180 of the one-piece cup 168 to the inboard and outboard edges 172, 176. In this way, the tapered bore 178 matches the mounting orientation of the cylindrical bearings 154, 164, where the first and second angles 160, 166 that the cylindrical bearings 154, 164 are supported at slope inwardly towards the intermediate portion 180 of the one-piece cup 168. Alternatively, the cylindrical roller bearings 154, 164 could be replaced by tapered roller bearings, high contact ball bearings, or a combination of tapered roller bearings and high contact ball bearings depending on the desired load rating.

It should also be appreciated that self-lubricating cartridge pinion input bearing 42 could be configured as a sealed grease bearing or a sealed oil bath bearing. In configurations where the self-lubricating cartridge pinion input bearing 42 is a sealed oil bath bearing, it could be provided with a remote sump, forced lubrication, and passive or active cooling. As such, the self-lubricating cartridge pinion input bearing 42 could be lubricated with grease, gear lube, or ATF (automatic transmission fluid).

A coupler 184 may be fixed for rotation with the outboard pinion shaft segment 116 by an internal spline 186 and the coupler 184 may be bolted or otherwise connected to a drive shaft (not shown) that is rotationally driven by a motor (not shown), through a transmission (not shown). A nut 187 is threadingly engaged with outboard pinion shaft segment 116. During an assembly and pinion input bearing preload process, nut 187 is rotated to axially translate a washer 189 to drive coupler 184 into contact with first cone 152. Desirable column loading may exist along first cone 152 and second cone 162. Beneficially, a pinion bearing preload may be preset within a sub-assembly of pinion 102, self-lubricating cartridge pinion input bearing 42, coupler 184 and nut 187 prior to coupling the pinion 102 to the carrier housing 40.

In typical drive axle assembly manufacturing facilities, one or more work stations are dedicated to setting pinion bearing preload. One well known procedure includes implementing a trial and error process where an initial quantity of shims are placed between a pinion bearing mounting flange and the carrier housing. A threaded fastener is driven to clamp the pinion bearing flange to the carrier which at the same time sets the pinion bearing preload. The magnitude of the pinion bearing preload is based on the thickness of the shim pack. If the first guess at shim thickness is incorrect, the assembler disassembles the pinion shaft, pinion gear, pinon flange arrangement and repeats the process using a different shim pack thickness. This iterative process continues until the pinion bearing preload is within a predetermined range. The self-lubricating cartridge pinion input bearing and pinion shaft design of the present disclosure eliminates this very time intensive work station from the axle assembly plant.

Another beneficial feature of the present disclosure relates to the inboard pinion shaft segment 114 being rotatably supported by a spigot bearing 182. The spigot bearing 182 includes an inside race 188 that extends annularly about the inboard pinion shaft segment 114, an outside race 190 that is supported by a spigot support boss 192 that protrudes axially from the inside face of the carrier housing 40 and extends annularly about the outside race 190 of the spigot bearing 182. A plurality of ball bearings 196 are positioned radially between the inside and outside races 188, 190 of the spigot bearing 182. As a result, the pinion shaft 108 can rotate relative to the carrier housing 40 about the pinion shaft axis 110. The spigot bearing 182 helps react gear separation forces resulting from the pinion gear/ring gear mesh and therefore reduces the amount of deflection experienced by the pinion shaft 108. This allows the first and second cones 152, 162 to be placed closer to each other resulting in a more compact size for the self-lubricating cartridge pinion input bearing 42, resulting in less weight. For example, the first and second cones 152, 162 can be placed next to each other in an abutting arrangement.

Figure 13:
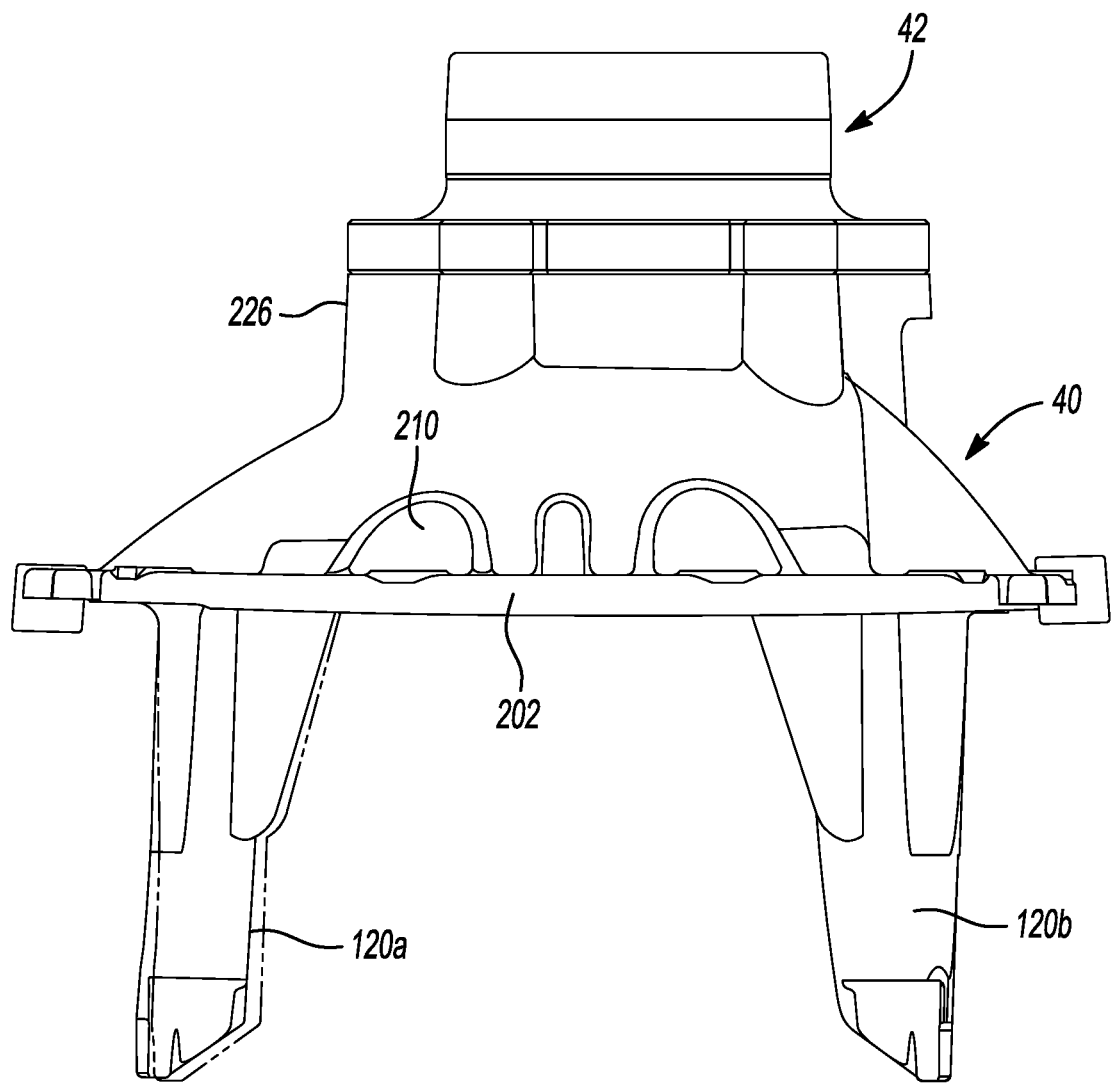
FIG. 13 is a side view of the carrier housing depicting a deflected differential bearing boss.
Figure 14:
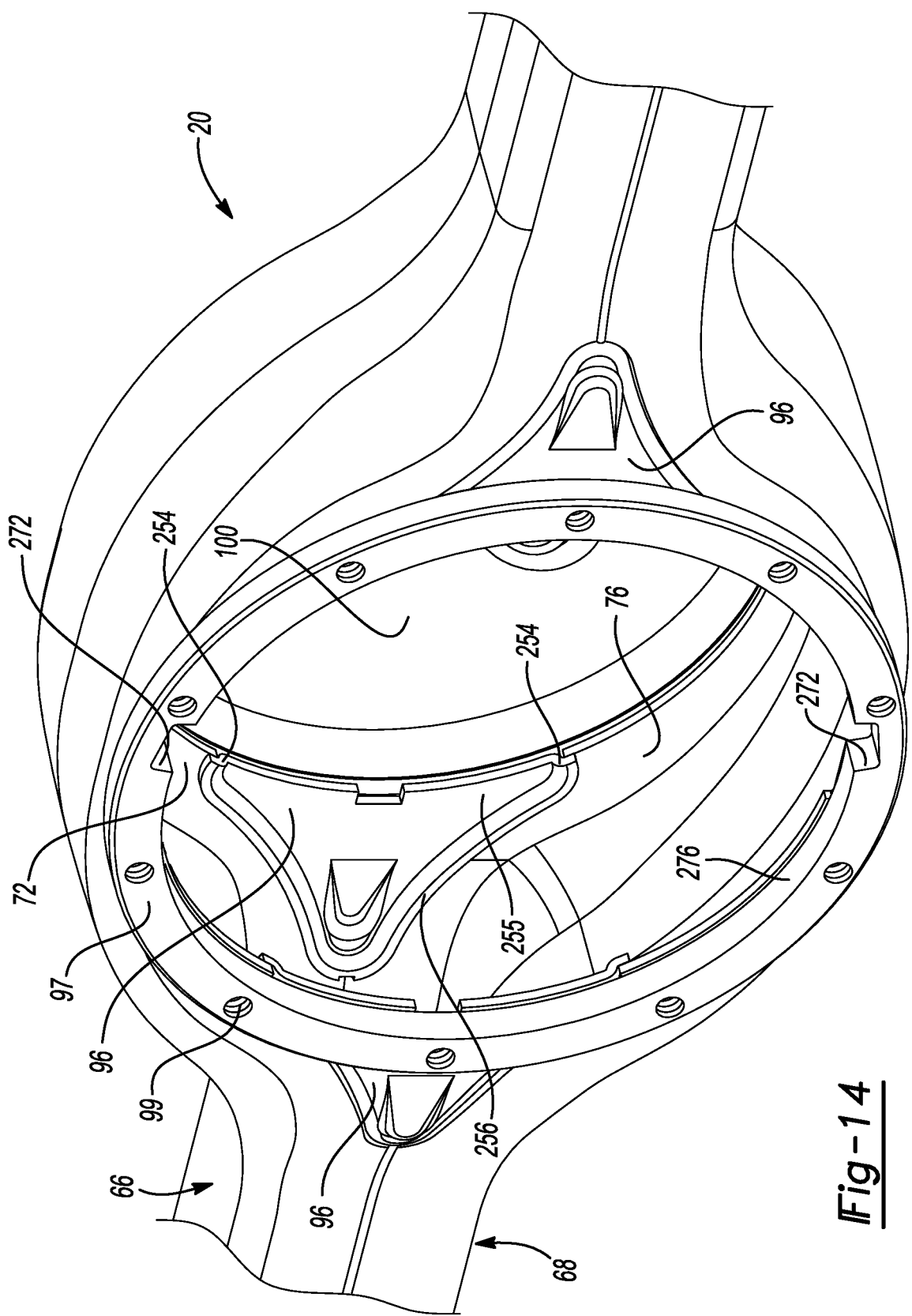
FIG. 14 is a fragmentary perspective view of an empty axle housing.
Figure 15:
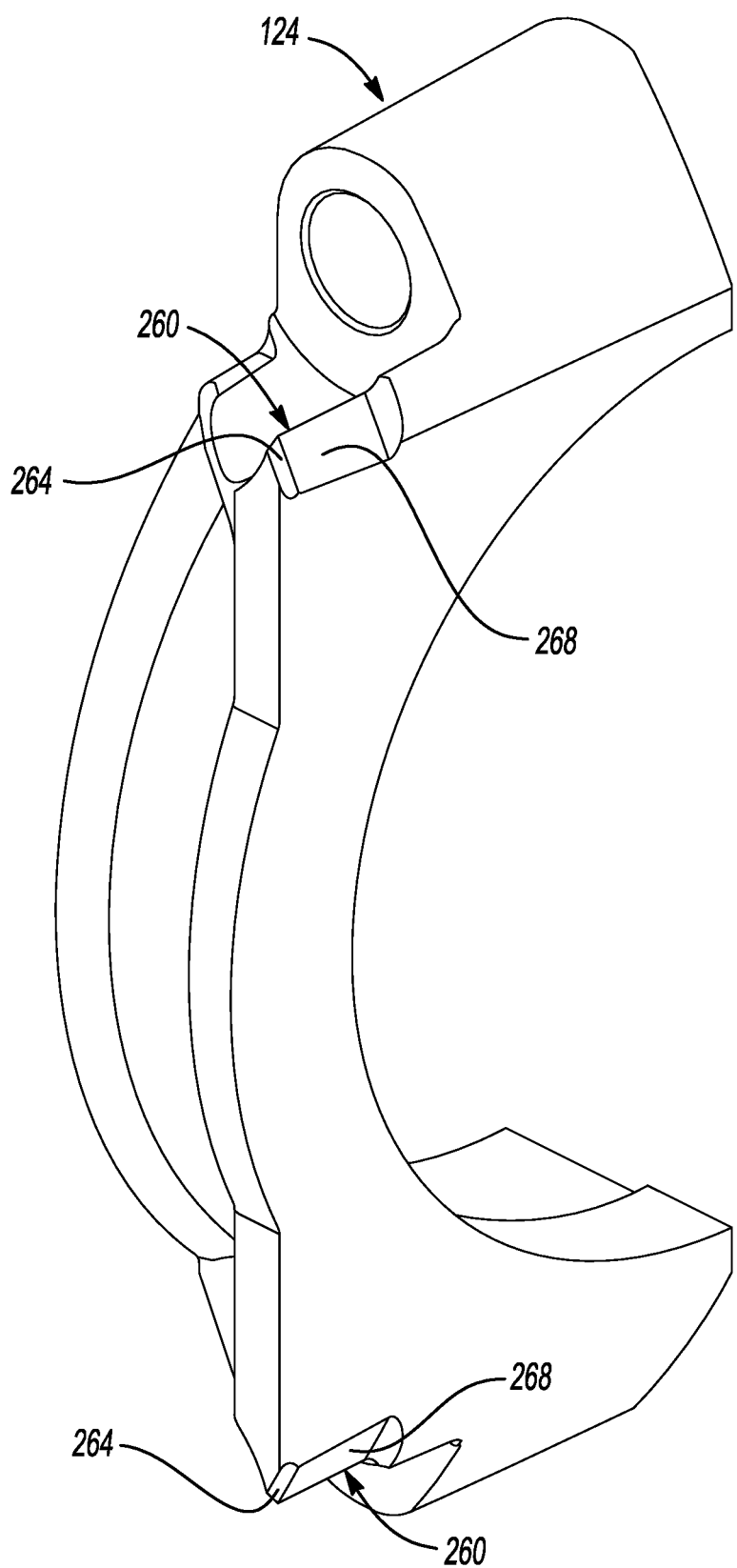
FIG. 15 is a perspective view of a bearing end cap.

FIGS. 6-11 show carrier housing 40 from a variety of different angles to illustrate how the geometry of interconnected bosses, gussets, and ribs defines a reduced weight carrier housing exhibiting excellent structural stiffness in resistance to ring and pinion gear separation forces as generally depicted in FIG. 12. FIG. 13 shows bearing boss 120a in phantom line representation in an undeflected state. The same figure depicts the position of bearing boss 120a when torque is transferred through the ring and pinion gearset at near maximum capacity of axle assembly 20. To minimize the deflection of bearing boss 120a as well as the deflection of pinion shaft 108, carrier housing 40 is a one-piece component including several integrally formed features. Carrier housing 40 may be cast from a metal alloy such as a grade of Ductile Iron including SG Iron Grade 485/12. Carrier housing 40 includes a curved wall 198 surrounded by a mounting flange 202. Mounting flange 202 includes a plurality of circumferentially spaced apart apertures 206 for receipt of fasteners fixing carrier housing 40 to axle housing 24. Arcuate walls 210 extend substantially perpendicularly to mounting flange 202 and at least partially circumscribe an associated aperture 206. Arcuate walls 210 interconnect curved wall 198 mounting flange 202. A first sidewall 212 perpendicularly extends from mounting flange 202. Several gussets 214a, 214b, 214c, 214d, 214e, 214f also perpendicularly extend from mounting flange 202. The first sidewall 212 and each of the gussets 214a-214f interconnect curved wall 198 with mounting flange 202. Gussets 214a-214f have a relatively thin cross-section or thickness t, when compared to their length L. Such a proportion defines a beam resistant to bending forces perpendicular to the direction of the length L.

Carrier housing 40 includes a second sidewall 218 that extends perpendicularly from mounting flange 202. Gussets 222a, 222b also extend substantially perpendicularly from mounting flange 202. Gussets 222a, 222b extend in parallel to gussets 214a-214f. Gussets 222a, 222b interconnect curved wall 198 with mounting flange 202. The orientation of the first and second sidewalls 212, 218 in conjunction with the integrally formed gussets defines a very rigid structure resistant to bending. More specifically, each of the gussets 222a, 222b and gussets 214a-214f extend in parallel to the gear separation forces F, as shown in FIG. 12. The gusset orientation best utilizes the mass of each gusset by forming a beam in the bending plane.

A pinion cartridge bearing mounting boss 226 axially protrudes from curved wall 198 and extends laterally to each of the first and second sidewalls 212, 218. A pinion cartridge bearing mounting face 230 provides a datum for alignment of the cartridge pinion input bearing 42 and a load path for pinion shaft loads to pass from the pinion cylindrical roller bearings 154, 164 through one-piece cup 168 to carrier housing 40. The robust construction elements previously described maintain proper positioning of the pinion gear 106.

Figure 9:
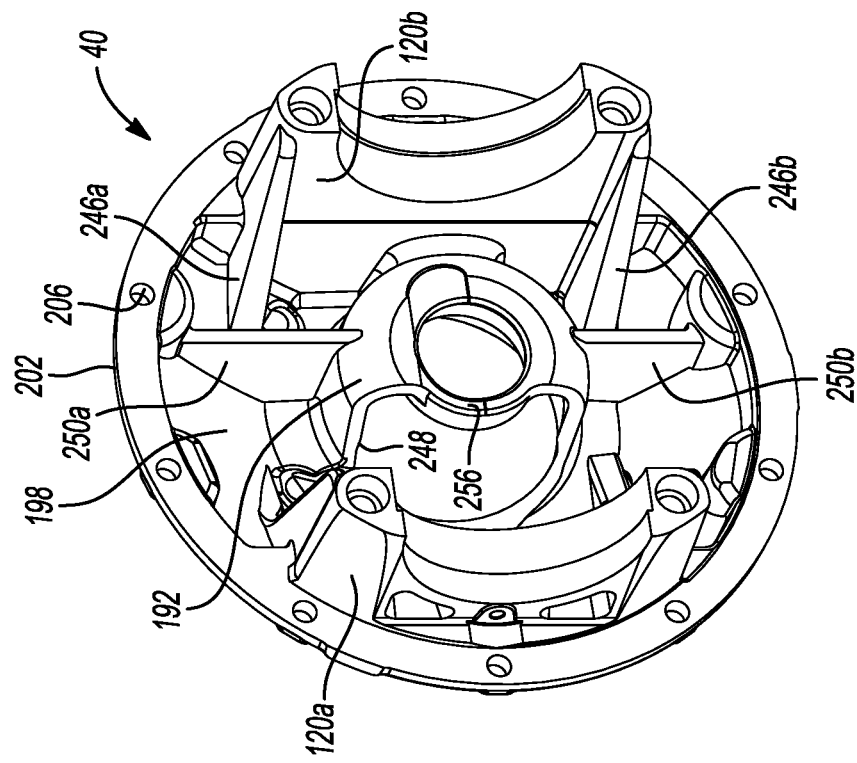
Figure 8:
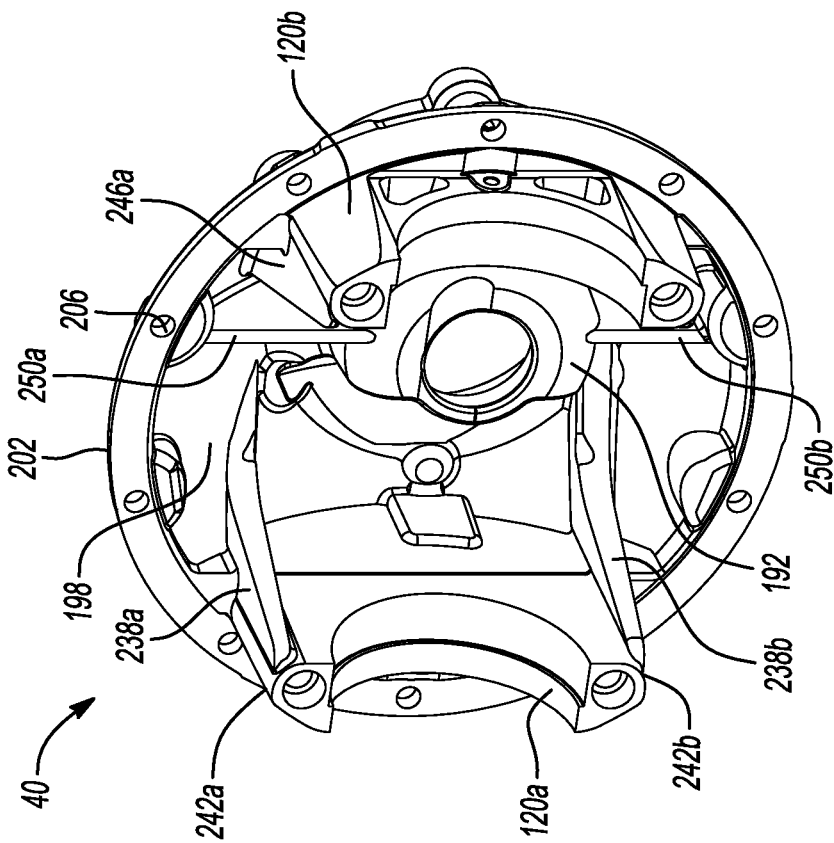
Figure 11:
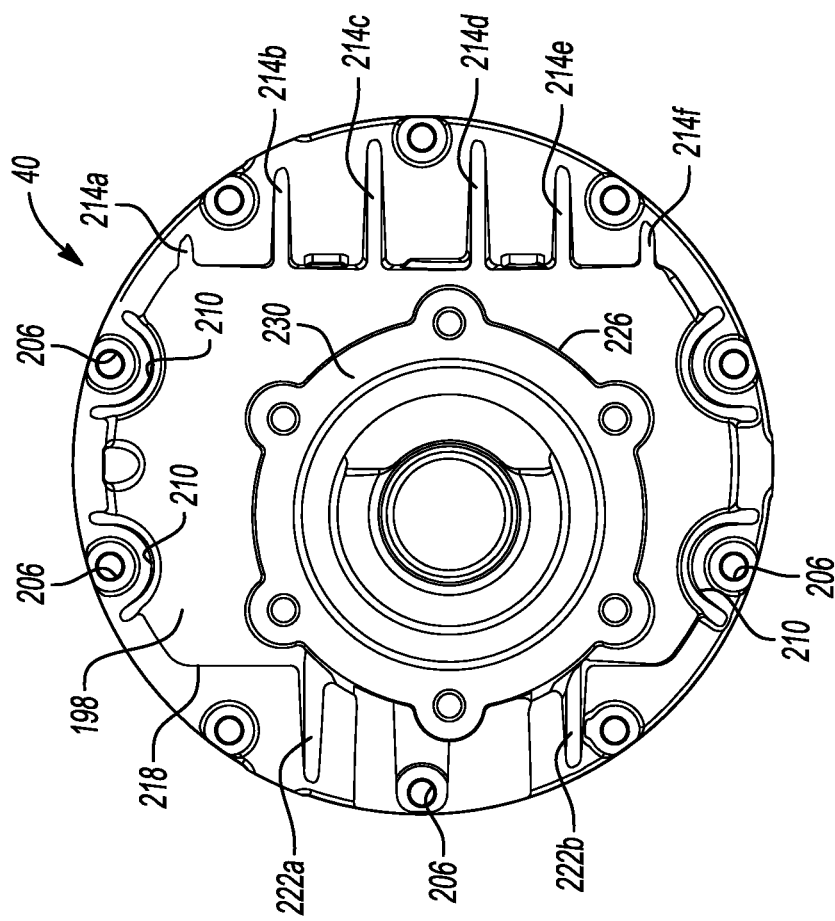
FIG. 11 is a rear view of the carrier housing.
Figure 10:
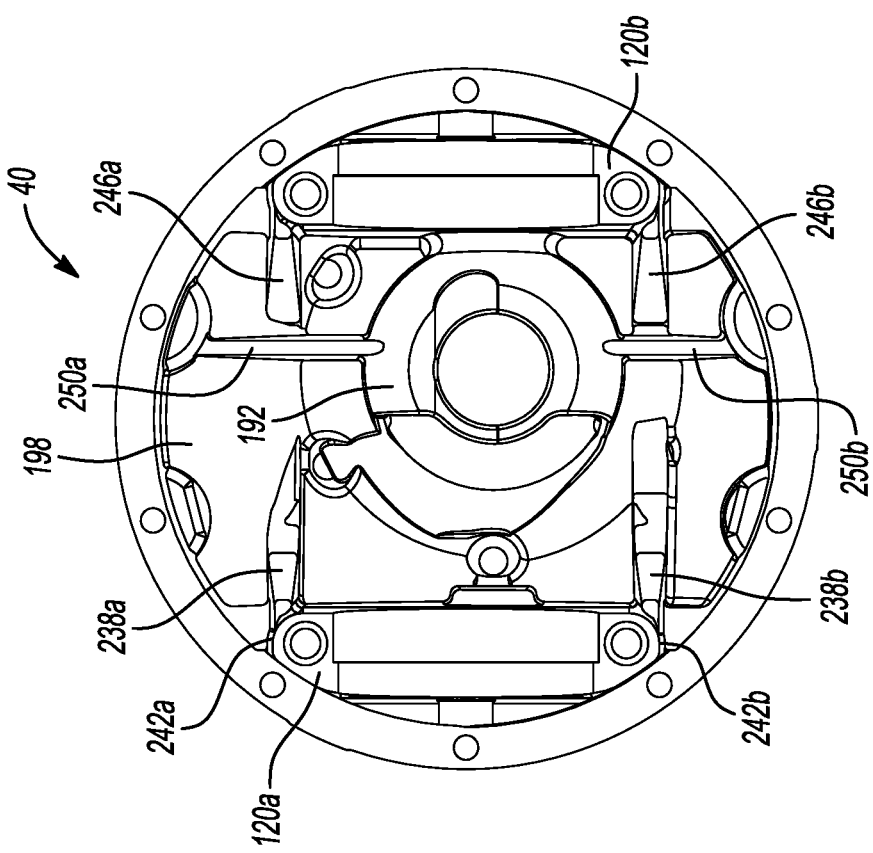
FIG. 10 is a front view of the carrier housing.

FIGS. 8-10 show the internal cavity side of carrier housing 40. Mounting bosses 120a, 120b are supported to minimize bending during power transfer through ring gear 130 and pinion gear 106. FIG. 13 depicts bearing boss deflection that may occur during vehicle operation. The amount of deflection depicted in FIG. 13 has been magnified several times for representation purposes. It should be appreciated that the maximum magnitude of bearing boss deflection that occurs in the presently described carrier housing 40 may be an order of magnitude less than the maximum bearing deflection in previously known drive axles.

Rigidity is increased by integrally forming first and second gussets 238a, 238b with first bearing boss 120a. First and second gussets 238a, 238b interconnect curved wall 198 with terminal ends 242a, 242b of first bearing boss 120a.

Similarly, third and fourth gussets 246a, 246b interconnect second bearing boss 120b and curved wall 198. Displacement of the first bearing boss 120a and the second bearing boss 120b due to bending is minimized.

Spigot support boss 192 axially extends from curved wall 198. An opening 248 extends through spigot support boss 192 to allow pinion gear 106 to at least partially extend therethrough. A first strut 250a extends in parallel with an axis of rotation of pinion gear 106. First strut 250a interconnects curved wall 198 with spigot support boss 192. A second strut 250b extends from an opposite side of spigot support boss 192 as first strut 250a. Second strut 250b also extends in parallel with the axis of rotation of pinion gear 106 to interconnect curved wall 198 with spigot support boss 192. Second strut 250b extends in substantial alignment with first strut 250a. Spigot support boss 192 includes an uninterrupted ring portion 256 that circumscribes spigot bearing 182. Spigot support boss 192, in combination with struts 250a, 250b, effectively supports spigot bearing 182 to minimize movement of pinion gear 106 from its initial position in an unloaded state when loaded during power transfer.

FIGS. 14-17 depict additional details useful for minimizing misalignment between ring gear 130 and pinion gear 106. In order to limit deflection of first bearing boss 120a and second bearing boss 120b during torque transfer, four bump stops 254 are machined on axle housing 24. More particularly, bump stops 254 are defined as planar surfaces machined at double thickness portions of axle housing 24 where truss plates 96 overlap portions of upper and lower beams 66, 68. Truss plates 96 include a substantially planar portion 255 at least partially encompassed by an offset flange 256. It should be appreciated that the four bump stops 254 are positioned on the side of axle housing 24 closest differential cover 100. Bump stops are not provided on the opposite side axle housing 24 that includes mounting flange 97. Each truss plate 96 is positioned such that flange 256 overlaps a portion of upper beam side wall 72 and a portion of lower beam side wall 76. At the overlap, a double-wall thickness of metal is provided. The geometry of the offset flange and the double-wall thickness significantly strengthens this portion of axle housing 24. For at least this reason, it is beneficial to position bump stops 254 at the reinforced double-thickness locations.

Figure 16:
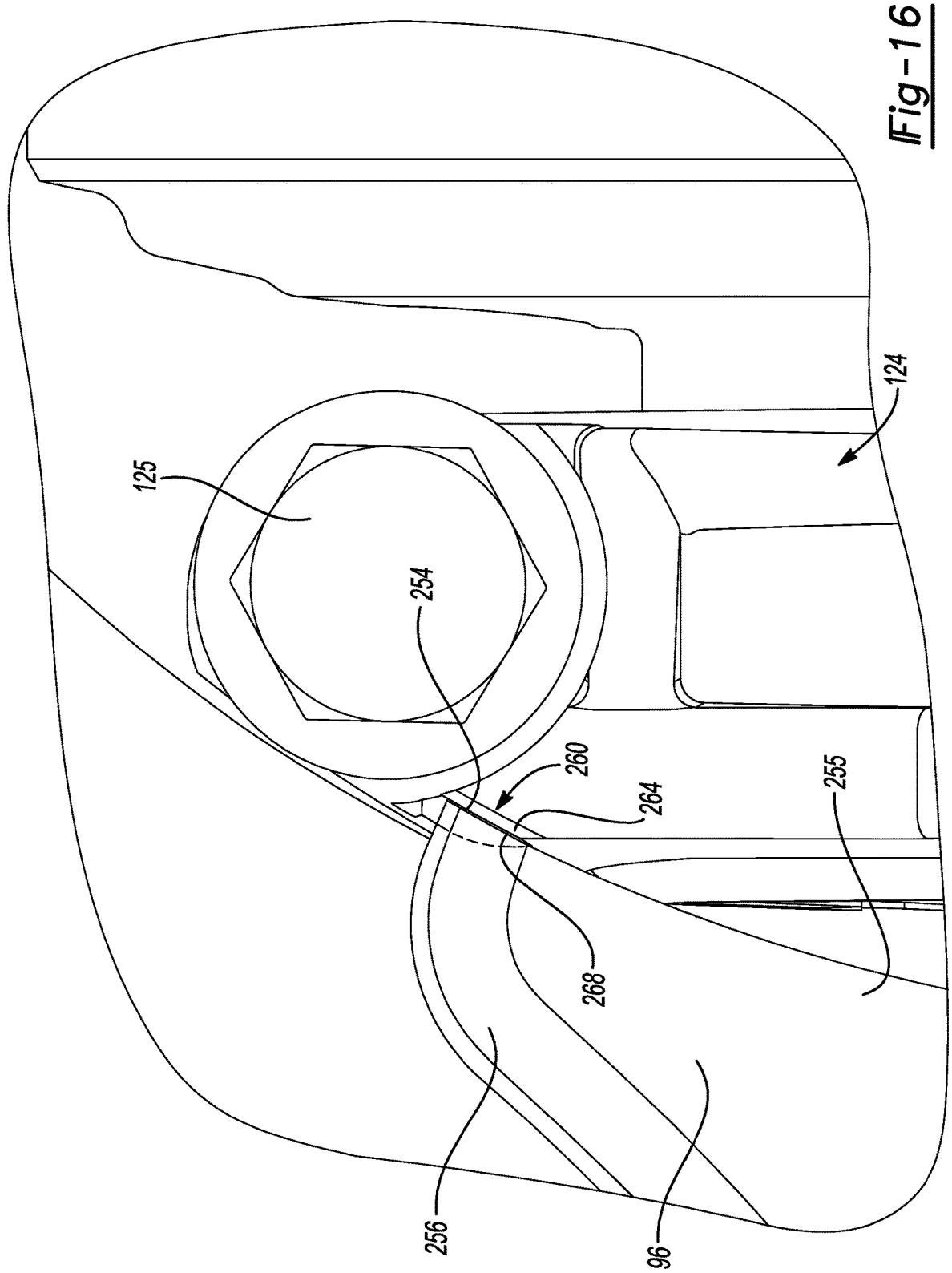
FIG. 16 is an enlarged fragmentary side view of an axle assembly depicting a bump stop in cooperation with a land of the bearing cap.
Figure 17:
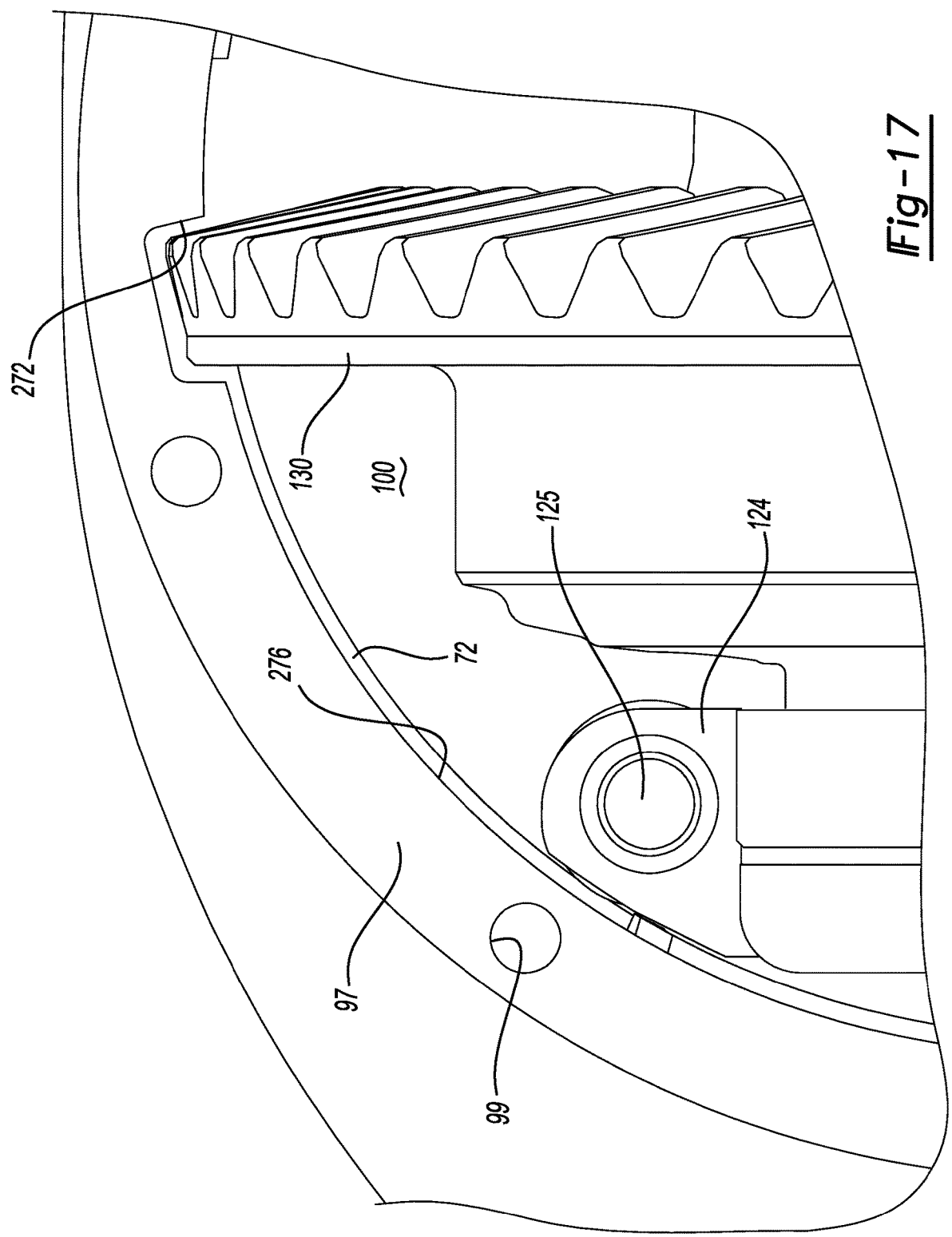
FIG. 17 is a fragmentary side view taken from the opposite direction as FIG. 16.

Each bearing cap 124 includes a set of machined surfaces 260 which cooperate with bump stops 254. Each set of machined surfaces 260 includes a chamfer 264 and a land 268. As best shown in FIGS. 16 and 17, each land 268 is precision machined to be spaced apart from a respective one of bumps stops 254 a minimal distance on the order of a few microns when torque is not being transferred between ring gear 130 and pinion gear 106. In one particular embodiment, it has been determined that a desired differential bearing preload may be obtained by rotating bearing adjustment nuts 127 until a spacing between first bearing boss 120a and second bearing boss 120b increases by 20 microns. The boss spacing after bearing adjustment is considered when machining the locations and relative spacing between bump stops 254. In this manner, an extremely small predetermined spacing between each land 268 and bump stop 254 pair is repeatedly provided. During vehicle operation and torque transfer through drive axle 20, deflection of first bearing boss 120a and second bearing boss 120b is restricted by one or more lands 268 engaging a respective one of the bump stops 254. Due to the minimal spacing between bump stops 254 and lands 268, a desired position of ring gear 130 relative to pinion gear 106 is maintained. Undesirable consequences of ring gear and pinion gear misalignment including increased gear surface sliding, increased gear surface contact stresses, and increased root bending stresses are avoided.

As depicted in FIG. 17, precision machining steps are not required to be performed on the axle opening opposite differential cover 100. For example, mounting flange 97 may include an aperture 276 sized to clear not only machined surfaces 260 but also rough cast surfaces of the remaining portions of first bearing boss 120a and second bearing boss 120b. In addition, it is contemplated that the initial stamping and welding operations associated with constructing axle housing 24 will provide sufficient clearance to the components of carrier assembly 26 during assembly and operation. A pair of clearance cutouts 272 extend through axle housing 24 to allow ring gear 130 to pass therethrough during assembly of carrier assembly 26 to axle housing 24.

Returning to FIG. 15 it should be appreciated that each set of machined surfaces 260 includes guide surfaces or chamfers 264 to provide a pilot for alignment of carrier assembly 26 to axle housing 24 during the assembly process. Because the clearance between lands 268 and bump stops 254 is very small, chamfers 264 provide a centering and alignment function while carrier assembly 26 is being axially inserted into inner volume 64 of axle housing 24. The provision of pairs of lands 268 with bump stops 254 also assures very accurate relative positioning of ring gear 130 to pinion gear 106 at initial assembly. In this manner, machined surfaces 260 and bump stops 254 not only assure proper initial alignment of pinion gear 106 with ring gear 130, but also maintain the desired relative positions of the gears during torque transfer through axle assembly 20.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. An axle assembly for a vehicle, including;
   an axle housing;
   a carrier assembly mounted to the axle housing, the carrier assembly including a carrier housing that is fixedly mounted to the axle housing, a pinion that includes a pinion gear and a pinion shaft that extends through the carrier housing along a pinion shaft axis, and a differential assembly that is rotatably supported by the carrier housing,
   the differential assembly including a differential housing and a ring gear fixed for rotation with the differential housing along a ring gear axis, the ring gear being arranged in meshing engagement with the pinion gear, wherein the pinion gear is positioned axially between a first pinion shaft segment and a second pinion shaft segment, wherein the first pinion shaft segment protrudes in a first direction from the pinion gear and the second pinion shaft segment protrudes in an opposite second direction from the pinion gear;

a spigot bearing mounted to the carrier housing and rotatably supporting the first pinion shaft segment; and a pinion input bearing rotatably supporting the second pinion shaft segment, wherein the pinion gear and the ring gear are urged away from one another by gear separation forces during torque transfer between the ring gear and the pinion gear, the carrier housing being a one-piece member including a curved wall circumscribed by a mounting flange, the carrier housing further including a plurality of integrally formed and parallel spaced apart gussets interconnecting the curved wall and the mounting flange, wherein the gussets extend in a direction parallel to the gear separation forces to resist bending of the carrier housing.

2. An axle assembly as set forth in claim 1, wherein the carrier housing includes an integrally formed bearing boss supporting the differential assembly for rotation relative to the carrier housing, the carrier housing including a plurality of gussets integrally formed with the bearing boss extending in a direction parallel to the ring gear axis.

3. An axle assembly as set forth in claim 2, wherein the carrier housing includes a spigot support boss and a first strut interconnecting the curved wall and the spigot support boss, the first strut extending in a direction parallel to the pinion shaft axis and perpendicular to at least one of the plurality of gussets integrally formed with the bearing boss.

4. An axle assembly as set forth in claim 1, wherein the pinion input bearing includes a first cone that extends annularly about the pinion shaft and supports a first set of cylindrical roller bearings at circumferentially spaced positions, a second cone that extends annularly about the pinion shaft and supports a second set of cylindrical roller bearings at circumferentially spaced positions, and a one-piece cup that extends annularly about the first and second sets of cylindrical roller bearings, wherein the carrier housing includes an integral mounting boss axially protruding from the curved wall, the one-piece cup being fixed to the mounting boss.

5. An axle assembly as set forth in claim 1, wherein the carrier housing includes a spigot support boss and a first strut interconnecting the curved wall and the spigot support boss, the first strut extending in a direction parallel to the pinion shaft axis.

6. An axle assembly as set forth in claim 5, wherein the carrier housing includes a second strut interconnecting the curved wall and the spigot support boss, the second strut extending in a direction parallel to the pinion shaft axis and aligned with the first strut.

7. An axle assembly as set forth in claim 1, wherein the differential assembly includes a planetary gearset rotatably mounted within the differential housing.

8. An axle assembly as set forth in claim 1, wherein the spigot support boss includes a window through which the pinion gear at least partially protrudes.

9. An axle assembly as set forth in claim 1, wherein the spigot support boss includes an uninterrupted ring portion in receipt of the spigot bearing.

10. An axle assembly as set forth in claim 1, wherein the spigot support boss includes an uninterrupted ring portion in receipt of the spigot bearing.

11. An axle assembly for a vehicle, including:
an axle housing; and
a carrier assembly mounted to the axle housing, the carrier assembly including a carrier housing that is fixedly mounted to the axle housing, a pinion that includes a pinion gear and a pinion shaft that extends through the carrier housing along a pinion shaft axis, and a differential assembly that is rotatably supported by the carrier housing, wherein the differential assembly includes a differential housing and a ring gear fixed for rotation with the differential housing about a ring gear axis, the ring gear being arranged in meshing engagement with the pinion gear, the carrier housing being a one-piece member including curved wall and an integral spigot support boss protruding from the curved wall, the support boss including an uninterrupted ring in receipt of a spigot bearing, the pinion shaft being rotatably supported by the spigot bearing and the spigot support boss, the carrier housing further including a first strut interconnecting the curved wall and the spigot support boss, the first strut extending in a direction parallel to the pinion shaft axis.

12. An axle assembly as set forth in claim 11, wherein the carrier housing includes a second strut interconnecting the curved wall and the spigot support boss, the second strut extending in a direction parallel to the pinion shaft axis and aligned with the first strut.

13. An axle assembly as set forth in claim 12, wherein the curved wall is circumscribed by a mounting flange, the carrier housing further including a plurality of integrally formed and parallel spaced apart gussets interconnecting the curved wall and the mounting flange, wherein the pinion gear and the ring gear are urged away from one another by gear separation forces during torque transfer between the ring gear and the pinion gear, the gussets extending in a direction parallel to the gear separation forces to resist bending of the carrier housing.

14. An axle assembly as set forth in claim 13, wherein the carrier housing includes an integrally formed bearing boss supporting the differential assembly for rotation relative to the carrier housing, the carrier housing including a plurality of gussets integrally formed with the bearing boss extending in a direction parallel to the ring gear axis.

15. An axle assembly as set forth in claim 14, wherein the spigot support boss includes a window through which the pinion gear at least partially protrudes.

16. An axle assembly as set forth in claim 15, wherein the uninterrupted ring is positioned adjacent the window.

17. An axle assembly as set forth in claim 14, wherein the plurality of gussets associated with the mounting flange and the plurality of gussets associated with the bearing boss extend parallel to one another.

18. An axle assembly for a vehicle, including:
an axle housing including a bump stop;
a carrier assembly mounted to the axle housing, the carrier assembly including a carrier housing that is fixedly mounted to the axle housing, a pinion that includes a pinion gear and a pinion shaft that extends through the carrier housing along a pinion shaft axis, and a differential assembly that is rotatably supported by the carrier housing, the differential assembly including a differential housing and a ring gear fixed for rotation with the differential housing along a ring gear axis, the differential housing being rotatably supported by a pair of bearings that are secured to the carrier housing by a pair of bearing caps, the ring gear being arranged in meshing engagement with the pinion gear, wherein the pinion gear is positioned axially between a first pinion shaft segment and a second pinion shaft segment, wherein the first pinion shaft segment protrudes in a first direction from the pinion gear and the second pinion shaft segment protrudes in an opposite second direction from the pinion gear;
a spigot bearing mounted to the carrier housing and rotatably supporting the first pinion shaft segment; and
a pinion input bearing rotatably supporting the second pinion shaft segment, wherein the pinion gear and the ring gear are urged away from one another by gear separation forces during torque transfer between the ring gear and the pinion gear, the carrier housing being a one-piece member including spaced apart first and second bearing bosses supporting the differential bearings, each bearing cap being fixed to a respective one of the first and second bearing bosses, wherein at least one bearing cap includes a land spaced apart from the bump stop when torque is not transferred between the ring gear and the pinion gear, the bump stop being positioned to be engaged by the land and limit deflection of the first and second bearing bosses during torque transfer between the ring gear and the pinion gear.

19. An axle assembly as set forth in claim 18, wherein the axle housing includes additional bump stops circumferentially spaced apart from one another, each bearing cap including two spaced apart lands, wherein each of the lands is positioned opposite a corresponding one of the bump stops to define a maximum magnitude of misalignment between the ring gear and the pinion gear.

20. An axle assembly as set forth in claim 19, wherein each bearing cap includes a guide surface spaced from the bump stop a distance greater than a spacing between the bump stop and the land, the guide surface being positioned to pass over the bump stop during assembly of the carrier assembly to the axle housing.

21. An axle assembly as set forth in claim 20, wherein the axle housing includes an upper beam, a lower beam and truss plates, the truss plates overlapping the upper and lower beams at positions corresponding to the location of the bump stops.

* * * * *